United States Patent [19]

Maitenaz

[11] 4,238,670
[45] Dec. 9, 1980

[54] METHOD AND DEVICE FOR REGULATING THE CLEANING TEMPERATURE OF AN OVEN

[75] Inventor: Paul Maitenaz, Orleans, France

[73] Assignee: Compagnie Europeenne pour l'Equipment Menager Cepem, Paris, France

[21] Appl. No.: 21,799

[22] Filed: Mar. 19, 1979

Related U.S. Application Data

[63] Continuation of Ser. No. 834,259, Sep. 15, 1977, abandoned.

[30] Foreign Application Priority Data

Sep. 28, 1976 [FR] France .................. 76 29084

[51] Int. Cl.³ .................. H05B 3/00; H05B 1/02
[52] U.S. Cl. .................. 219/413; 219/398; 219/486
[58] Field of Search .................. 219/390–398, 219/406–408, 412–414, 486–489

[56] References Cited

U.S. PATENT DOCUMENTS 3,808,402  4/1974  Rea .................. 219/413

FOREIGN PATENT DOCUMENTS 2290120  5/1976  France .................. 219/413
1238286  7/1971  United Kingdom .................. 219/412
1282099  7/1972  United Kingdom .................. 219/408

Primary Examiner—C. L. Albritton
Assistant Examiner—Bernard Roskoski
Attorney, Agent, or Firm—Haseltine, Lake & Waters

[57] ABSTRACT

Regulation of the temperature of a pyrolitically cleaned cooking oven during cleaning to avoid local overheating of the oven base plate enamel. A heating-up power level is used until near the pyrolitic temperature, and then a lower power level is used for maintaining the oven at about the pyrolitic cleaning temperature. The change over takes place preferably at about 470° C.

6 Claims, 4 Drawing Figures

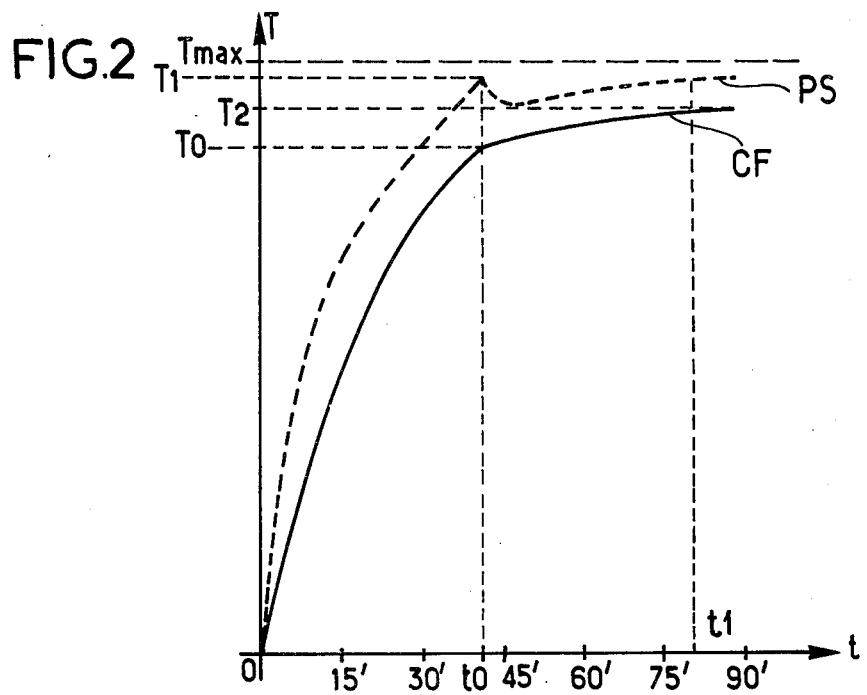
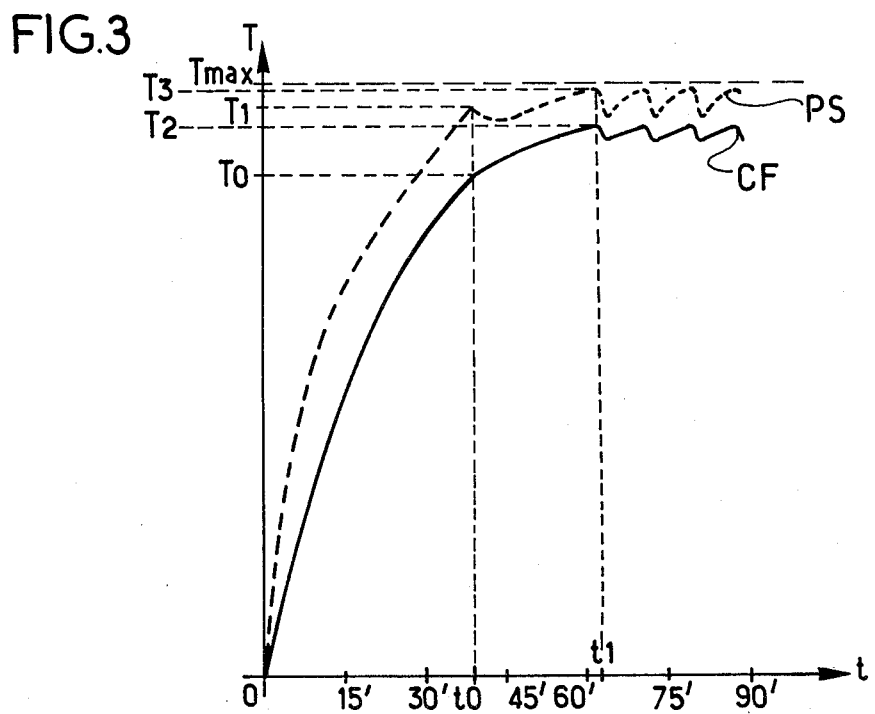

METHOD AND DEVICE FOR REGULATING THE CLEANING TEMPERATURE OF AN OVEN

This is a continuation of application Ser. No. 834,259, filed Sept. 15, 1977, now abandoned.

BACKGROUND OF THE INVENTION

The invention relates to the regulation of the cleaning temperature of pyrolytic ovens whose base plate heating element is outside the cooking chamber.

The cleaning of the cooking oven by pyrolysis is a known operation which consists in destroying the dirt due to splashes on the walls which occur during cooking, by bringing the oven and the dirt to a high temperature.

Pyrolytic cleaning requires temperatures of the order of 400° to 500° C., but it is necessary to reach a temperature of the order of 500° C. for the operation to be effected completely in an acceptable time justifying the adoption of this method. Further, the present state of the art limits the maximum temperature which can be withstood by enamel-lined walls having all the necessary characteristics of a cooking oven to about 520° to 550° C., that is unless the quantities of parts concerned justify the provision of a special high temperature vitrifying oven for the sole manufacturing operation of applying a refractory enamel having a higher vitrification temperature.

The result of this is that to clean effectively in a shorter time, e.g. one and a half hours as a function of the degree of dirtying, the temperature of the walls of the furnace must be as homogenous as possible as soon as 500° C. is approached. This is obtained relatively easily when the heating elements of the oven are situated inside the heat-proof chamber.

However, this no longer applies when the base plate heating element of the oven is situated outside the oven chamber, for the following reasons: for cost price reasons the base plate elements used for heating during cooking have a heat emission rate (power per unit area) which is fairly high, so that local overheating of the wall occurs in the immediate vicinity of the heating element, this not being a disadvantage as long as the temperature is sufficiently far from pyrolysis temperatures. A known solution, in the U.S. Pat. No. 3,121,158 consists in reducing, for the pyrolysis operation, the emission rate of the hearth heating element by connecting it in series with another heating element, but, to obtain the power necessary for a sufficiently rapid rise to the required temperatures, one or several extra heating elements whose use is reserved for cleaning operations must then be added at the front edge of the oven liner and around the door.

SUMMARY OF THE INVENTION

Preferred embodiments of the present invention obtain the same result without requiring the addition of extra heating elements for pyrolytic cleaning.

The present invention provides a method of regulating the cleaning temperature of a pyrolytically cleaned cooking oven which includes a base plate heating element which is outside the oven chamber, the method comprising a first step of applying a heating-up power to the oven until the centre of the oven reaches a predetermined threshold temperature near the end of the rise in temperature during a cleaning operation and then a second step of applying a reduced power for maintaining the pyrolitic cleaning temperature, thereby reducing the time taken to reach pyrolitic cleaning temperature while avoiding local overheating of the oven base plate.

The use of a cleaning temperature maintaining power which is reduced in relation to the heating-up power allows an increase in cleaning efficiency by homogenization of the inside temperature of the chamber. Preferably the threshold temperature lies in the range 420° to about 470° C., in general the nearer to the hot end of the range the better.

During the second step the power applied for maintaining the pyrolitic cleaning temperature may be regulated by on/off switching of a slightly excessive power level at about the desired temperature, or by changeover switching between a slightly too high level and a slightly too low level of power at a temperature which is a little below the desired temperature.

In an oven embodying the invention, the base plate heating element is formed of two independent parts: a central part and a peripheral part, Since the central part of the base plate wall normally reaches a higher temperature than the peripheral part due to the higher losses of this latter part, a reduction in power affecting exclusively the central part of the base plate element can be obtained by connecting this element in series with another element heating the oven, e.g. the heating element of the grill, hence without addition of an extra non-cooking element, since it is necessary only to compensate the heat losses of the oven and that these losses are small because of the good heat-proofing required for the temperature reached in pyrolysis.

The change in power can be controlled by a two-stage change-over thermostat one stage limiting the temperature of the chamber of the oven at the temperature chosen for the cleaning operation, the other comprising a change-over switch for a slightly lower temperature and changing the heating power.

The characteristics and advantages of the invention will become apparent from the description hereinafter of an embodiment given by way of an example with reference to the figures of the accompanying drawings in which:

IN THE DRAWINGS

FIG. 2 is a regulation diagram in the case where the heating power used during the pyrolysis operation is equal to the power needed to compensate the heat losses of the oven;

FIG. 3 is a regulation diagram in the case where the heating power during the pyrolysis operation is slightly greater than the power needed for compensation.

DESCRIPTION OF THE INVENTION

Figure 1:
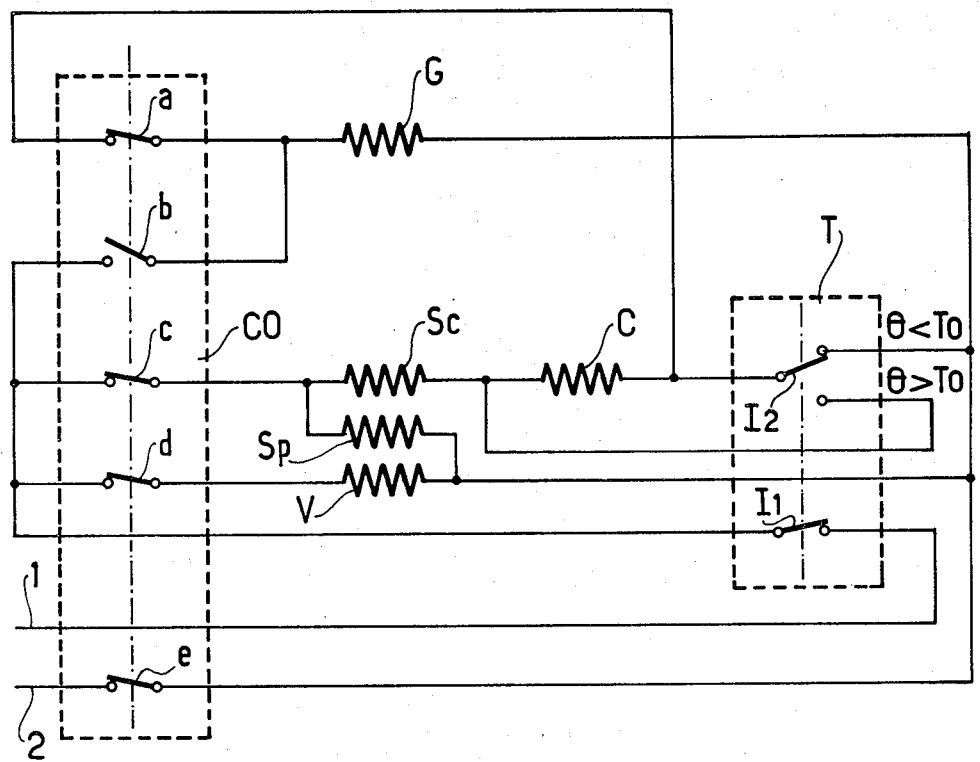
FIG. 1 is a circuit diagram of the regulator device.
Figure 4:
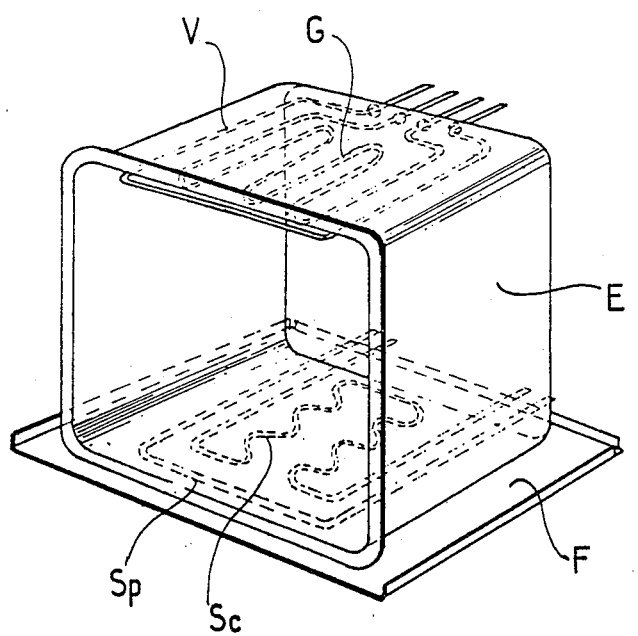
FIG. 4 is a perspective view illustrating the heater elements with respect to the walls of the oven.

As shown in FIG. 1, an oven switch CO comprises contacts a, b, c, d, and e, which feed various heating elements of the oven from a power source 1, 2 e.g.: a top resistor V, a grill resistor G, base plate resistors comprising a central part Sc and a peripheral part Sp, and the resistor of a smoke catalyser C. A pyrolysis thermostat T including two contacts I1 and I2 allows the temperature of the oven to be limited to a temperature T2 by means of its contact I1, this temperature being chosen for the pyrolytic cleaning operation, e.g. 500° C., by cutting out all the elements used for heating the oven; the change-over contact I2, in a first position, short-circuits the grill-resistor G and connects in series the central base plate resistor Sc and the catalyser resistor C; in the second position it connects in series the central base plate resistor Sc and the grill resistor G.

Operation is as follows:

The control of a cleaning operation is obtained when the contacts a, c, d, and e of the oven switch CO are closed and b is open. The cleaning thermostat T comprising a first stage I1 whose triggering temperature is adjusted to a temperature close to the maximum cleaning temperature, for example 500° C. and a second stage I2 which changes over at a temperature To slightly lower than the previous temperature, To being the temperature of the end of the rise, for example 470° C.

The cleaning operation is carried out with the top resistor and the peripheral base plate resistor to which are added: -at the beginning of the operation until To, the resistors Sc and C in series; so that an accidental breakage of the catalyser resistor prevents the heating of the central part of the hearth and thereby prevents pyrolysis operation. -after the change-over switch of the cleaning thermostat has changed over to To, the resistors G and Sc in series. The catalyst being already in action, its temperature is sufficient without extra heating and it is therefore no longer necessary to feed the resistor C.

As the resistance of C is small in relation to the resistance of G, the reduction of power obtained is substantial and by the judicious choice of the spacing out of the resistors Sc and Sp, it is easy to obtain the required reduction.

FIG. 2 shows the heating curves of the oven centre CF and of the base plate wall PS in the case where compensation for the calorific losses is substantially obtained at the end of the cleaning operation. The time $t_o$ corresponds to the temperature To of the oven centre which is slightly lower than the temperature T2 adopted as a maximum temperature for the oven centre during the cleaning operation. The temperature T1 of the base plate wall, higher than the temperature To also corresponds to the time $t_o$; this temperature T1 is chosen to be less than the temperature Tmax which depends essentially on the enamel used for the oven walls. Since pyrolytic cleaning is more rapid at higher temperature, a temperature Tmax is chosen to be as high as possible. On examining the curve CF, it will be seen that there is a rapid rise up to the time to which corresponds to the changing over of the contact I2 of the pyrolysis thermostat T, then the rise in temperature is smaller, subsequent to the reduction in the heating power and to the increase in heat losses; it increases up to the temperature T2 without there being any oscillation. Now, on examining the curve PS, there is a rapid rise up to the time $t_o$, temperature T1, then the rising speed of the temperature decreases subsequent to the reduction of the heating power and to the increase in heat losses; then increases asymptotically towards a maximum temperature which can be Tmax.

However, in practice, it is necessary to take into account the dispersions due to the variations in voltage of the distribution network and to those of the heat-proofing of the oven. In these conditions it is only possible to define a reduced power which is close to the compensation power. So a reduced power is chosen which, in the most unfavourable case is still slightly greater than the power for compensation of the heat losses. The heating curves of FIG. 3 are then obtained which are distinguished from those of FIG. 2 by a slightly higher rise in temperature from the time $t_o$ and by an on/off regulation from the time t1 at which the contact I1 of the thermostat T comes into action. On examining the curve CF of the centre of the oven, there is a rapid rise in the temperature up to the time $t_o$ to reach the temperature To, then a less rapid rise between the times $t_o$ and $t_1$ where the centre of the oven reaches the temperature T2 which triggers the cleaning thermostat from which it oscillates as does the temperature of the base plate wall PS from a temperature T3 which is slightly less than the temperature Tmax which the enamel of the base plate wall can withstand. It is observed that the difference between Tmax and and the average temperature of the oven centre is greater than that of FIG. 2.

By implementing the method according to the invention, the temperatures To and T1 can be reached in a time of less than 40 minutes, this making it possible to reduce appreciably the duration of the pyrolytic cleaning operation.

What we claim is:

1. A pyrolitically cleaned cooking oven having a cooking chamber, a base plate heating element disposed under said cooking chamber of said oven, said base plate heating element comprising two independent parts, including a central part and a peripheral part, means responsive to the initiation of a cleaning cycle for applying power to a top element and full power to said peripheral part and for applying reduced power to said central part by means of a series connection between said central part and a catalyst resistor, whereby heating of the central part of the oven is prevented in case of accidental breakage of the catalyst resistor; means for applying full power to said top plate element and full power to said peripheral part and for applying power to said central part by means of a series connection between said central part and a grill resistor, in response to the center of the oven reaching a predetermined threshold temperature at a level slightly below the nominal cleaning temperature during a cleaning operation, and means for maintaining a pyrolitic cleaning temperature when said pyrolitic cleaning temperature is reached.

2. An oven apparatus according to claim 1, wherein: said control means for avoiding local overheating of the oven base plate comprises: a change-over switch of heating elements when the predetermined threshold temperature lies in the range 420° to about 470° C.

3. An oven according to claim 2, wherein: the predetermined threshold temperature is of the order of about 470° C.

4. An oven according to claim 1, wherein: the reduced heating power applied at said predetermined threshold temperature is slightly greater than or equal to the power needed to compensate for heat losses from the oven at the cleaning temperature.

5. An oven according to claim 1, wherein: two stage change-over thermostat switch means are employed, one stage for limiting the temperature of the oven chamber at the temperature chosen for the cleaning operation, the other stage comprising a change-over switch for controlling said control means for avoiding local overheating of the oven base plate.

6. An oven according to claim 5, wherein: said change-over thermostat switch means effects three stages of the cleaning operation, a first stage under said predetermined threshold temperature, a second stage at a temperature slightly less than the maximum temperature adopted for the end of the cleaning operation, for applying a heating power equal to or slightly greater than the power needed to compensate the heat losses and a third stage acting by on/off action with respect to power.

* * * * *